United States Patent Office 3,338,666
Patented Aug. 29, 1967

3,338,666
PREPARATION OF A MULTILAYER COPPER OXIDE CATALYST FOR TREATMENT OF EXHAUST GASES
Moises G. Sanchez, Severna Park, and Leonard V. Triggiani, Hyattsville, Md., assignors to W. R. Grace & Co., New York, N.Y., a corporation of Connecticut
No Drawing. Filed June 5, 1964, Ser. No. 373,113
4 Claims. (Cl. 23—2)

ABSTRACT OF THE DISCLOSURE

Method of treating exhaust gases of internal combustion engines to oxidize air pollutants contained therein, comprising passing a mixture of the exhaust gases and air over a catalyst comprising 10 to 20 weight percent copper oxide and an alumina base in which 40 to 60 percent of the CuO is impregnated on the surface of the alumina and 40 to 60 percent is present in bulk dispersed through the alumina. And a method of preparing the catalyst comprising: adding an ammonium hydroxide to a copper nitrate solution to precipitate 40 to 60 percent of the copper as CuO; adding alumina to form a paste and impregnate the alumina; drying and calcining the paste; and preparing the paste as a pellet.

---

This invention relates to an exhaust catalytic system for internal combustion engines. In one specific aspect, it relates to a catalytic system suitable for conversion of carbon monoxide and hydrocarbons to innocuous entities.

Air pollution has become a serious problem in many urban areas. It is well known that the major portion of organic pollutants in the air is derived from unburned or partially burned auto exhaust. Carbon monoxide, another pollutant of much concern because of its toxic nature is also mainly derived from exhaust emissions.

It has been realized that the most practical way to treat exhaust fumes to reduce hydrocarbon and carbon monoxide pollution is to oxidize the hydrocarbon to carbon dioxide and water and to oxidize the carbon monoxide to carbon dioxide.

A wide selection of oxidation catalysts has been prepared in the past varying both in chemical composition and physical structure. With respect to chemical composition, the ability of a great variety of metals and metal oxides either alone or in combination to catalyze the complete oxidation of hydrocarbons has been noted. Generally, however, the catalysts which are effective for hydrocarbon oxidation are not sufficiently effective for carbon monoxide oxidation or vice versa.

Another major obstacle to preparing a useful auto exhaust catalyst is the problem of lead in gasoline and the high temperatures reached in automobile exhaust systems. Many catalysts which would otherwise be effective are rendered completely useless due to lead fouling and/or high temperatures.

Our object, then, is to prepare a catalyst with good hydrocarbon and carbon monoxide conversion activity as well as adequate resistance to lead fouling and good high temperature stability.

We have found that a catalyst having these desirable properties is prepared by impregnating an alumina base with copper oxide while also dispersing some copper oxide particles in bulk in the alumina matrix. Copper oxide alumina catalysts which have been prepared in the past are deactivated at high temperatures due to the formation of copper aluminate. In the presence of lead, the formation of the inactive compound is hastened, thus deactivating the catalyst even more rapidly. Therefore, by prior art methods, it has been difficult to prepare a CuO—$Al_2O_3$ auto exhaust catalyst that would remain active for any appreciable time.

By our method, the interaction between CuO and $Al_2O_3$ is greatly reduced. Therefore, the catalys remains active in the face of both high temperatures and lead.

Our catalyst is prepared to contain about 10 to 20 weight percent CuO. About 40 to 60% of the CuO is impregnated on the surface of the alumina and the remaining 60 to 40% is dispersed through the alumina medium. Generally, about 50% impregnated CuO and 50% dispersed CuO is preferred.

Broadly speaking, our process consists of preparing a copper salt solution, adding ammonium hydroxide to precipitate part of the copper, leaving the remainder in solution, adding alumina to form a paste, drying the paste, pelleting and finally activating the catalyst.

The first step in our process consists of selecting the base. We have found that gamma alumina which is commercially available in a variety of physical forms makes a most suitable base. The alumina should be ground to about a 60 mesh powder (Tyler Standard Screen Scale) before use.

As the next step of our process, a copper salt solution is prepared to contain a sufficient amount of salt to prepare a final catalyst containing 10 to 20 weight percent CuO. Suitable copper salts include the nitrate, chloride, bromide and tartrate, for example. A solution of ammonium hydroxide is added to precipitate a portion of the copper as cupric oxide. This precipitate is the copper oxide which is present in bulk, dispersed in the alumina matrix in the final catalyst. Generally, about 50% of the copper in the solution should be precipitated in this manner. After the precipitation is complete, alumina powder is added to the copper salt solution to form a paste. Through this step, the copper remaining in solution becomes impregnated on the surface of the alumina. The paste is then dried for about 12 to 16 hours at 200° C., followed by calcination at about 1000° F. for 2 to 8 hours.

Following calcination, the material is ground to a powder (about 60 mesh), then pelleted using standard techniques. The pellets are activated by calcining for 2 to 3 hours at about 1000° F. and ½ hour at 1200° F.

The activity of our catalyst is tested by measuring the time elapsed before conversion of the exhaust gases begins. This is measured by passing a mixture of gases maintained at a predetermined inlet temperature over a 70 ml. volume of catalyst spread over a length of 5 inches. Total flow of the gases over the catalyst is 8.15 liters per minute. The mixture of gases used for the test contains 4.3% carbon monoxide, 4.7% oxygen, 1% water and 90% nitrogen along with 5000 parts per million of normal hexane.

The gases are admitted to a testing unit containing the catalyst. A thermocouple is inserted in the catalyst bed just above the entrance point of the gases. The takeoff time ($\tau$) is the time required for the thermocouple to just exceed 750° F., the temperature of the inlet gas. This elevation in temperature is an indication that the oxidation of the components of the gaseous mixture has begun. An active catalyst will begin converting rapidly and the bed temperature will exceed inlet temperature in a relatively short time, i.e., about 2 to 8 minutes.

Our invention will be further explained by the following specific but non-limiting examples.

EXAMPLE I

A total of 120 grams of $Cu(NO_3)_2 \cdot 3H_2O$ was dissolved in 250 ml. of water. Ammonium hydroxide was prepared by diluting 25 ml. of concentrated ammonium hydroxide to 100 ml. with water. 24 ml. of the dilute $NH_4OH$ was added to the copper nitrate solution with vigorous stirring. After precipitation had ceased, 250 grams of powdered gamma alumina (60 mesh) were added with vigorous stirring to form a paste. The paste was dried for 16 hours at 200° C. in a forced draft oven and then calcined at 1000° F. for 4 hours. The material was ground to pass through a 60 mesh screen, then pelleted and calcined for 2 hours at 1000° F. and ½ hour at 1200° F. The final catalyst contained 16% CuO of which about 50% was impregnated on the alumina while the remainder was present in bulk.

The activity of the catalyst was measured by determining take-off time ($\tau$) by the method previously described. In order to test the thermal stability of the catalyst, it was calcined for 16 hours at 1400° F. and the activity remeasured. The lead resistance was measured by contaminating the catalyst with 10% PbO, calcining for an additional 16 hours at 1400° F., and remeasuring the activity. The catalyst was contaminated with lead by spraying a solution of lead nitrate onto the surface to deposit 10% PbO. The catalyst was then calcined for 16 hours at 1400° F. A catalyst is considered to have good lead resistance if take-off time after the lead treatment is no more than 4 to 5 times that for the fresh catalyst. Results of the three measurements are shown below:

*Take-off time ($\tau$)*

| | |
|---|---|
| Fresh catalyst | 4 minutes 37 seconds. |
| Catalyst calcined 16 hrs. at 1400° F. | 4 minutes 25 seconds. |
| Catalyst with 10% PbO and 16 hrs. at 1400° F. | 17 minutes 19 seconds. |

EXAMPLE II

This run is similar to that described in Example I, except that more ammonia was used in the preparation.

One-hundred twenty grams of $Cu(NO_3)_2 \cdot 3H_2O$ were dissolved in 250 ml. of water. 41 ml. of dilute ammonium hydroxide, prepared as described in Example I, were added to the copper nitrate solution with vigorous stirring. The pH of the copper solution was 2.75 before ammonia addition and 3.1 after. After precipitation had ceased, 250 grams of gamma alumina (60 mesh) were added with vigorous stirring to form a paste. The paste was dried for 16 hours at 200° C. in a forced draft oven and then calcined at 1000° F. for 4 hours. The material was ground to pass through a 60 mesh screen, then pelleted and calcined for 2 hours at 1000° F. and ½ hour at 1200° F. The final catalyst contained 16% CuO of which about 50% was impregnated on the alumina and the remainder present in bulk.

The activity of the catalyst was measured by the method previously described. Results are shown as follows:

*Take-off time*

| | |
|---|---|
| Fresh catalyst | 4 minutes 13 seconds. |
| Catalyst calcined 16 hrs. at 1400° F. | 4 minutes 4 seconds. |
| Catalyst with 10% PbO and 16 hrs. at 1400° F. | 13 minutes 40 seconds. |

The data shows that this catalyst exhibited good activity as well as good thermal and lead resistance.

EXAMPLE III

In this run, concentrated ammonium hydroxide was used to precipitate the CuO.

A total of 75 grams of $Cu(NO_3)_2 \cdot 3H_2O$ was dissolved in 800 milliliters of water. About 10 milliliters of concentrated $NH_4OH$ were added to the solution with vigorous stirring. While stirring was continued, 250 grams of 60 mesh gamma alumina were added. The mixture was dried at 150–200° C. for 18 hours, then calcined for 4 hours at 1000° F. The dried material was ground to pass through a 60 mesh screen, then pelleted with 4% sterotex. The pellets were calcined for 2½ hours at 1000° F. and ½ hour at 1200° F. The final catalyst contained 10% CuO, 50% of which was impregnated on the base and the remaining amount present in bulk.

The activity of the catalyst was determined by the method previously described with the following results:

*Take-off time ($\tau$)*

| | |
|---|---|
| Fresh catalyst | 4 minutes 28 seconds. |
| Catalyst calcined 16 hrs. at 1400° F. | 5 minutes 4 seconds. |
| Catalyst with 10% PbO and 16 hrs. at 1400° F. | 9 minutes 50 seconds. |

EXAMPLE IV

A solution was prepared by dissolving 75 grams of $Cu(NO_3)_2 \cdot 3H_2O$ in 250 milliliters of water. About 8 milliliters of concentrated $NH_4OH$ were added to the solution with vigorous stirring. 250 grams of 60 mesh gamma alumina were added to the solution while stirring continued. The mixture was dried at 150–200° C. for 18 hours, then calcined for 4 hours at 1000° F. The material was ground to 60 mesh, mixed with 4% sterotex, then pelleted. The pellets were calcined for 2½ hours at 1000° F. and ½ hour at 1200° F. The final catalyst contained 10% CuO of which about 50% was impregnated on the base while the remainder was present in bulk.

The activity of the catalyst was tested by the method previously described. Results are shown below:

*Take-off time ($\tau$)*

| | |
|---|---|
| Fresh catalyst | 4 minutes 12 seconds. |
| Catalyst calcined 16 hrs. at 1400° F. | 5 minutes 28 seconds. |
| Catalyst with 10% PbO and 16 hrs. at 1400° F. | 9 minutes 20 seconds. |

The data clearly show that the catalyst has excellent activity as well as high temperature and lead resistance.

EXAMPLE V

For comparison, a conventional $CuO$–$Al_2O_3$ catalyst was prepared to contain 10 weight percent CuO with 100% of the CuO impregnated on the base.

The impregnating solution was prepared by dissolving cuprous chloride and tartaric acid in ammonia. The gamma alumina pellets were immersed in the solution until impregnation was complete. The pellets were then removed, dried and calcined for 3 hours at 1000° F.

The activity of the catalyst was tested by the method previously described. The results are as follows:

*Take-off time ($\tau$)*

| | |
|---|---|
| Fresh catalyst | 9 minutes, 27 seconds. |
| Catalyst calcined for 16 hrs. at 1400° F. | 9 minutes, 20 seconds. |
| Catalyst with 10% PbO and 16 hrs. at 1400° F. | 31 minutes, 35 seconds. |

It is clearly seen that the activity of the catalyst of our invention is far superior to that of the conventional $CuO$–$Al_2O_3$ catalyst.

What is claimed is:

1. A catalyst for converting the carbon monoxide and hydrocarbon pollutants of the exhaust of internal combustion engines to innocuous entities which comprises 10 to 20 weight percent copper oxide and a gamma alumina base in which 40 to 60 percent of the CuO is impregnated on the surface of the alumina and 40 to 60 percent is present in bulk disposed through the alumina matrix.

2. A process for preparing catalysts suitable for use in a catalytic system for oxidation of air pollutants in the exhaust of an internal combustion engine which comprises preparing an aqueous copper nitrate solution to contain sufficient copper salt to prepare a final catalyst containing 10 to 20 weight percent CuO, adding ammonium hydroxide to precipitate about 40 to 60 percent of the copper as CuO, adding sufficient gamma alumina powder to the solution to form a paste, drying the paste for 12 to 16 hours at 200° C., calcining the dried paste for 4 hours at 1000° F., grinding the dried paste to a powder, pelleting, calcining the pellets for 2 to 3 hours at 1000° F. and ½ hour at 1200° F. and, finally, recovering the catalyst for use in the system.

3. A process for preparing catalyst suitable for use in a catalytic system for oxidation of air pollutants in the exhaust of an internal combustion engine which comprises preparing an aqueous copper nitrate solution to contain sufficient copper salt to prepare a final catalyst containing 10 to 20 weight percent CuO, adding ammonium hydroxide to precipitate about 50 percent of the copper as CuO, adding sufficient gamma alumina powder to the solution to form a paste, drying the paste for 12 to 16 hours at 200° C., calcining the dried paste for 4 hours at 1000° F., grinding the dried paste to a powder, pelleting, calcining the pellets for 2 to 3 hours at 1000° F. and ½ hour at 1200° F. and, finally, recovering the catalyst for use in the system.

4. A method for treating exhaust gases of internal combustion engines to oxidize the air pollutants therein which comprises mixing said gases with air, passing said mixture through a catalyst bed consisting essentially of 10 to 20 weight percent cupric oxide and a gamma alumina base in which about 40 to 60 percent of the CuO is impregnated on the alumina base, and the remaining 40 to 60 percent is dispersed in bulk in the alumina matrix and passing the thus treated gases to the atmosphere.

References Cited

UNITED STATES PATENTS

| | | | |
|---|---|---|---|
| 2,696,475 | 12/1954 | Farrow | 252—463 |
| 2,925,394 | 2/1960 | Brennan | 252—463 X |
| 3,231,516 | 1/1966 | Gary | 252—463 X |

OSCAR R. VERTIZ, *Primary Examiner.*

A. J. GREIF, *Assistant Examiner.*